(12) United States Patent
Perry et al.

(10) Patent No.: US 9,053,249 B2
(45) Date of Patent: Jun. 9, 2015

(54) REMOVABLE MEMORY CARTRIDGE AND DOCKING STATION COMPATIBLE WITH MEDIA DRIVE EXPANSION SLOTS

(71) Applicant: Imation Corp., Oakdale, MN (US)

(72) Inventors: David Martin Perry, Berthoud, CO (US); Yung Yip, Afton, MN (US); Christopher Thomas Bukowski, Boulder, CO (US); Chris James Zwettler, Stillwater, MN (US); George Phillip Rambosek, Shafer, MN (US); Kellan Donald Pauly, Wahpeton, MN (US); Daniel Charles Egan, Oakdale, MN (US); Kevin Peter Vlasich, Lino Lakes, MN (US); Jason E. Moses, Breckenridge, MN (US); Denis J. Langlois, River Falls, WI (US); George W. Blattner, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 265 days.

(21) Appl. No.: 13/672,290

(22) Filed: Nov. 8, 2012

(65) Prior Publication Data

US 2013/0117488 A1    May 9, 2013

Related U.S. Application Data

(60) Provisional application No. 61/557,138, filed on Nov. 8, 2011.

(51) Int. Cl.
| | | |
|---|---|---|
| *G06F 21/78* | (2013.01) | |
| *G06F 13/40* | (2006.01) | |
| *G11B 23/28* | (2006.01) | |
| *G11B 33/08* | (2006.01) | |
| *G11B 33/12* | (2006.01) | |
| *G06F 1/18* | (2006.01) | |
| *G06F 21/44* | (2013.01) | |

(Continued)

(52) U.S. Cl.
CPC ............. *G06F 13/4081* (2013.01); *G11C 5/04* (2013.01); *G11B 23/28* (2013.01); *G11B 33/08* (2013.01); *G11B 33/122* (2013.01); *G11B 33/124* (2013.01); *G06F 1/187* (2013.01); *G06F 21/44* (2013.01); *G06F 21/73* (2013.01); *G06F 21/78* (2013.01); *G06F 2221/2129* (2013.01)

(58) Field of Classification Search
CPC ....... G06F 1/1632; G06F 21/78; G06F 21/79; G11C 5/04
USPC .................................. 711/115; 710/303, 304
See application file for complete search history.

(56) References Cited

U.S. PATENT DOCUMENTS

| | | |
|---|---|---|
| 5,140,478 A | 8/1992 | Yoshida |
| 5,737,185 A | 4/1998 | Morrison et al. |
| 6,684,283 B1 * | 1/2004 | Harris et al. .................. 710/302 |

(Continued)

OTHER PUBLICATIONS

PCT International Search Report dated Feb. 8, 2013, from corresponding application PCT/US2012/064160.

(Continued)

*Primary Examiner* — Glenn A Auve
(74) *Attorney, Agent, or Firm* — Dorsey & Whitney LLP

(57) ABSTRACT

A system for data storage including a removable memory element having a data storage device, and a docking station in communication with a host device and configured for receiving the removable memory cartridge so as to put the host system in communication with the data storage device.

28 Claims, 12 Drawing Sheets

(51) Int. Cl.
*G06F 21/73* (2013.01)
*G11C 5/04* (2006.01)

(56) References Cited

U.S. PATENT DOCUMENTS

| | | | |
|---|---|---|---|
| 7,484,025 B2 * | 1/2009 | Son et al. | 710/301 |
| 8,590,060 B2 * | 11/2013 | Walkes | 726/34 |
| 2006/0212637 A1 | 9/2006 | Lo et al. | |
| 2006/0215301 A1 | 9/2006 | Hamming | |
| 2006/0234797 A1 | 10/2006 | Davis et al. | |
| 2007/0050583 A1 | 3/2007 | Nishimura et al. | |
| 2007/0086156 A1 * | 4/2007 | Skinner | 361/685 |
| 2007/0180177 A1 * | 8/2007 | Jones et al. | 710/301 |
| 2011/0022792 A1 * | 1/2011 | Kay | 711/111 |
| 2012/0079198 A1 * | 3/2012 | Bondurant et al. | 711/115 |
| 2013/0067167 A1 * | 3/2013 | Bondurant et al. | 711/115 |

OTHER PUBLICATIONS

PCT Written Opinion dated Feb. 8, 2013, from corresponding application PCT/US2012/064160.

* cited by examiner

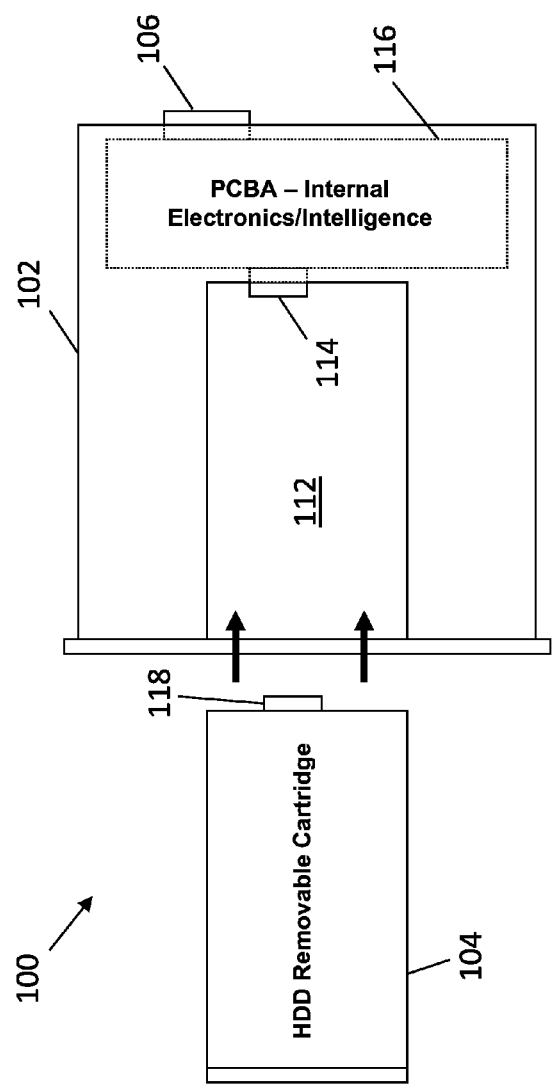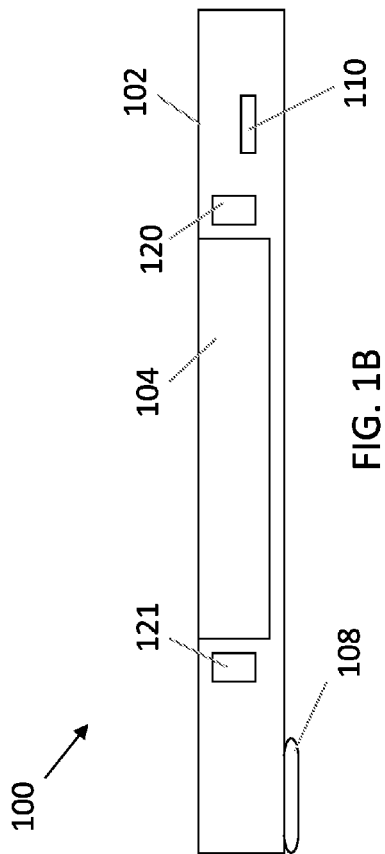

REMOVABLE MEMORY CARTRIDGE AND DOCKING STATION COMPATIBLE WITH MEDIA DRIVE EXPANSION SLOTS

FIELD

The present disclosure relates to systems and methods for removable memory cartridges and docking stations compatible with media drive slots, such as slots designed for slim-line optical media drives.

BACKGROUND

Laptops and servers typically contain one or more dedicated slots or expansion slots for receiving optical drives. The attach rate of optical drives, however, is declining, and many laptops and servers are being ordered without an optical drive, and thus, the dedicated slot is unused. Previous solutions addressing these unused slots have included systems by which an optical drive slot can be occupied by a hard disk drive (HDD) or solid-state memory module, which uses the same electrical interface and communication protocol used by an optical drive. Such memory module has a similar form-factor, dimensions, and other features that allow it to be inserted, electrically coupled, mechanically retained, and ejected like an optical drive.

However, these systems are mounted as fixed drives and do not provide a user-friendly method facilitating, for example, interchangeability and expandability. For example, such systems do not provide drive letter or device persistence, they can be relatively large and bulky, and they provide limited shock and vibration resistance.

Thus, there exists a need in the art for systems and methods for removable memory cartridges and docking stations compatible with unused media drive slots, such as slots designed for slim-line optical media drives. There also exists a need in the art for systems and methods for removable memory cartridges and docking stations that provide expandable storage capacity via interchangeable, removable memory cartridges and permit drive letter or device persistence.

SUMMARY

The present disclosure, in one embodiment, relates to a system for data storage. The system may include a removable memory element having data storage devices, and a docking station in electrical communication with a host device and configured for receiving the removable memory cartridge so as to put the host system in communication with the data storage elements of the removable memory cartridge. In one embodiment, the system may further include a memory cartridge configured for receiving the removable memory element from the docking station. The memory cartridge may include shock protection features. In additional or alternative embodiments, the removable memory element may include shock protection features. In some embodiments, the docking station can be dimensioned to fit a standard slim-line media drive slot. In further embodiments, the docking station may include a receiving bay with no top or bottom walls, and the removable memory element may have a height substantially equal to a height of the docking station. The data storage devices of the removable memory element may be hard disks, solid state devices, or any suitable combinations thereof.

In additional embodiments, the system may include a media drive adapter including a data cartridge drive bay configured to accommodate a removable data cartridge, a data cartridge connector configured for data communication with the removable data cartridge when the removable data cartridge is positioned within the drive bay, and a media drive connector configured for data communication with a host system when the media drive adapter is positioned within a media drive slot coupled to the host system.

The removable data cartridge may be configured as a first data storage medium, and the media drive slot may be configured for a second data storage medium, different from the first data storage medium of the removable data cartridge. The media drive adapter may be operated to provide data communication between the host system and the removable data cartridge when the media drive adapter is positioned within the media drive slot coupled to the host system, and the data cartridge is positioned within the drive bay.

In particular examples, the first data storage medium of the removable data cartridge may comprise a magnetic data storage medium and the second data storage medium may comprise an optical data storage medium, for which the media drive slot is configured on the host system. For example, the removable data cartridge may comprise a magnetic disk and the media drive slot may comprise an optical disk drive slot configured for an optical disk drive.

The media drive adapter may also include an ejection mechanism for ejecting the data cartridge from the drive bay, for example based on an eject or dismount command from the host system, or a based on a control input from an eject or mount/dismount button or switch on the media drive adapter itself. The ejection mechanism may include a motor and gear assembly coupled to a cam mechanism, configured for ejecting the removable data cartridge from the drive bay based on the ejection or mount/dismount command from the host computer, or from a user. In addition, the cam mechanism can also be configured for locking the removable data cartridge into the drive bay when the removable data cartridge is inserted into the media drive adapter.

Embodiments of a data storage system may include a removable data cartridge inserted into the media drive adapter. The data storage system may incorporate a damping mechanism coupled between an outer housing of the removable data cartridge and an inner side of the drive bay. The damping mechanism may include one or more resilient members configured to suspend the removable data cartridge within the drive bay, and to provide at least partial mechanical isolation between the drive bay and the removable data cartridge.

In data storage configurations for host systems, a data storage device may include a media drive adapter positioned within a drive slot configured for an optical data storage device. The media drive adapter may include a drive bay and a media drive connector coupled to the drive slot, where the media drive connector is operable for data communication with a host system coupled to the drive slot.

A removable data cartridge may be positioned within the drive bay. The removable data cartridge may include a magnetic data storage medium and a data cartridge connector coupled to the media drive adapter, so that the media drive adapter is operable to provide data communications between the host system and the removable data cartridge via the media drive connector and the data cartridge connector.

Depending on configuration, the media drive adapter may include a cam mechanism operable to lock the removable data cartridge into the drive bay when the removable data cartridge is inserted into the media drive adapter. An ejection mechanism may also be provided, operable to operate the cam mechanism to eject the removable data cartridge from the drive bay, for example based on an eject signal from the host system via the media drive connector, or based on a user input via an eject button or other mount/dismount control feature on the media drive adapter. The device may also include a motion isolation mechanism, for example a mechanism with a resilient damping member operable to suspend the removable data cartridge within the drive bay, with the outer housing of the removable data cartridge spaced from the inner sides of the drive bay to reduce vibrations and provide at least partial mechanical isolation.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 1A illustrates a top view of a system and method for removable memory cartridges and docking stations compatible with one or more media drive slots according to one embodiment of the present disclosure.

FIG. 1B illustrates a front view of the system and method for removable memory cartridges and docking stations compatible with media drive slots, as shown in FIG. 1A.

DETAILED DESCRIPTION

Figure 2:
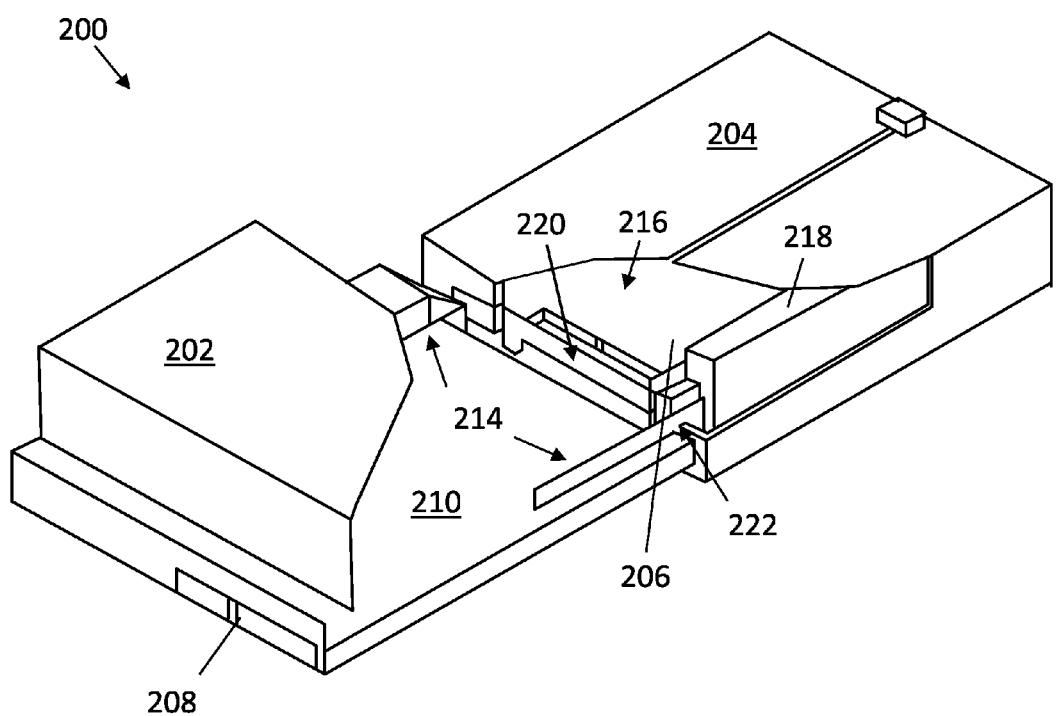
FIG. 2 is a perspective view of another embodiment of a system and method for removable memory cartridges and docking stations compatible with media drive slots according to the present disclosure.

The present disclosure relates to novel and advantageous systems and methods for removable memory cartridges and docking stations compatible with media drive expansion slots, such as slots designed for slim-line optical media drives. For example, the present disclosure relates to removable memory cartridges and docking stations which are compatible with slim-line DVD slots resident on, for example, late model servers and personal computers.

As discussed above, most server and personal computer chassis contain at least one dedicated mounting slot for an optical disk drive. With the advent of, for example, network based software updates, the necessity of optical media for server installations has been diminished. As a result, many optical slots in modern server installs are shipped unpopulated. Similarly, the attach rate of optical drives is declining in personal computers, and many laptops, for example, are being ordered without an optical drive, thus leaving an unused media slot.

Accordingly, an opportunity exists to fill such media slots with higher capacity removable storage elements. FIGS. 1A and 1B generally illustrate one embodiment of a system 100 for a removable memory cartridge and docking station compatible with media drive slots as disclosed herein. Particularly, a system 100 for a removable memory cartridge and docking station compatible with media drive slots may include a docking station or stationary memory cartridge receptacle 102 and a removable memory cartridge 104. Together, the stationary cartridge receptacle 102 and removable memory cartridge 104 form a storage element, which is accessible by a host computing device, such as but not limited to a server or personal computer.

The stationary cartridge receptacle 102 may be sized and dimensioned such that it is compatible with standard dimensions of a mounting slot for a media drive, such as slots designed for slim-line optical media drives. A traditional slim-line media expansion slot has maximum cross-section dimensions of 12.7 mm×128 mm, or 9.5 mm×128 mm, or other cross-section dimensions. Accordingly, in one embodiment, a stationary cartridge receptacle 102 may be sized and dimensioned such that it is compatible with a media expansion slot having a height of about 12.7 mm and a width of about 128 mm. However, the stationary cartridge receptacles disclosed herein are not limited to being compatible with such dimensions, and the stationary cartridge receptacles may be dimensioned to be compatible with any suitable or desirable dimensions. The stationary cartridge receptacle 102 may be installed in a media drive expansion slot by means similar to those used for optical media drives, and in some embodiments may be "plug and play," as understood by those skilled in the art. In this regard, the stationary cartridge receptacle 102 may include one or more suitable connectors 106 or connecting means, such as but not limited to a serial ATA (SATA) connector, for operably connecting the stationary cartridge receptacle with the remaining components of the host computing device, such as the processing components, via a bus. While generally intended to be left in a media drive expansion slot for an extended period of time, the stationary cartridge receptacle 102 may be installed temporarily or permanently in the media drive expansion slot. In this regard, the stationary cartridge receptacle 102 may include an eject latch 108, permitting relatively easy removal from the media drive expansion slot. The stationary cartridge receptacle 102 may also include other additional features, such as but not limited to indicator lights 110, etc.

As illustrated in FIG. 1, the stationary cartridge receptacle 102 may include a receiving bay 112 or slot for receiving a removable memory cartridge 104. The receiving bay 112 may be sized and dimensioned such that the removable memory cartridge 104 will substantially easily fit and be accepted by the receiving bay. The receiving bay 112 may be sized and dimensioned such that the removable memory cartridge 104 may partially, substantially, substantially entirely, or entirely fit within the receiving bay. In one particular embodiment, the receiving bay 112 may have substantially the same size and dimensions as the removable memory cartridge 104, although sufficiently larger than the removable memory cartridge to permit the removable memory cartridge to fit substantially or entirely within the receiving bay. The receiving bay 112 may include one or more suitable connectors 114 or connecting means, such as but not limited to a SATA connector, for operably connecting the removable memory cartridge 104 with the stationary cartridge receptacle 102. The stationary cartridge receptacle 102 may include one or more electrical components provided, for example, in a printed circuit board assembly 116 that may be interconnected between the connectors 106 and 114, which may be used, for example but not limited to, to translate communications received by the processing components of the server or personal computer to communications that would be understood by the removable memory cartridge 104 or to perform data storage management tasks.

As indicated above, a removable memory cartridge 104 may be removably positioned partially, substantially, substantially entirely, or entirely within the receiving bay 112 of the stationary cartridge receptacle 102. As such, the removable memory cartridge 104 may be sized and dimensioned such at least a portion of the removable memory cartridge 104 will substantially easily fit and be accepted by the receiving bay 112. In a particular embodiment, as indicated above, the removable memory cartridge 104 may have substantially the same size and dimensions as the receiving bay 112, although slightly smaller than the receiving bay, thereby permitting the removable memory cartridge to fit substantially, substantially entirely, or entirely within the receiving bay. The removable memory cartridge 104 may include data storage or memory elements or devices, such as hard disk drives or solid state devices, and any other hardware and software desired for controlling the data storage devices or providing data storage management. As mentioned above, slim-line slots may have a maximum height of 12.7 mm, 9.5 mm, or other height; such height can provide sufficient clearance for a removable memory cartridge 104 to contain a suitable number of for example, 12.5 mm, 9.5 mm, or 7 mm, 2.5" (63.5 mm) hard disk drives. However, as technology increases and sizes decrease, it is appreciated that any suitable number, type, and size of hard disk or other drives at any suitable size may be used. Similarly, the removable memory cartridge 104 may additionally or alternatively include any suitable amount of solid state memory devices, which again may increase as technology increases and sizes decrease. The removable memory cartridge 104 may include one or more suitable connectors 118 or connecting means, such as but not limited to a SATA connector, for operably connecting the removable memory cartridge 104 with the stationary cartridge receptacle 102, via connector 114 of the receiving bay. Other suitable connectors also may be used.

In some embodiments, the removable memory cartridge 104 may also include shock and/or vibration protection for the memory elements contained therein. Shock and/or vibration protection may be provided to protect against shock and/or vibration in the x, y, and/or z coordinate directions.

In some embodiments, one or both of the stationary cartridge receptacle 102 or removable memory cartridge 104 may include release devices, such as but not limited to mechanical release mechanisms, that permit the removable memory cartridge to be relatively easily removed or ejected from the stationary cartridge receptacle. In additional embodiments, the release devices may include an actuator 120, such as but not limited to a button or other tactile means, for actuating the release device such that the removable memory cartridge 104 may be released or partially or substantially ejected from the stationary cartridge receptacle, and removed therefrom.

The cartridge receptacle (or media drive adapter) 102 may also include one or more associated control features 121, including, but not limited to, eject and mount/dismount buttons, data formatting and security switches, and similar control features. The indicator lights 110 may be provided in a variety of faun to present related operational or status information, including, but not limited to, light emitting diode (LED) indicators and other visual display elements for indicating the mount/dismount or eject status of removable data cartridge 104, and/or additional operational or status information such as the data read/write status, security status, media format and storage capacity of data cartridge 104.

FIG. 2 illustrates another embodiment of a system 200 for a removable memory cartridge and docking station compatible with media drive slots as disclosed herein. Particularly, a system 200 for a removable memory cartridge and docking station compatible with media drive slots may include a docking station or stationary docking station 202 and a memory cartridge 204 having a removable memory element 206. FIG. 2 illustrates the removable memory element 206 presently housed within the memory cartridge 204, but ready for insertion into the stationary docking station 202. Together, the stationary docking station 202 and removable memory element 206 form a storage element, which is accessible by a host computing device, such as but not limited to a server or personal computer.

Similar to the embodiment of FIG. 1, the stationary docking station 202 may be sized and dimensioned such that it is compatible with standard dimensions of a mounting slot for a media drive, such as slots designed for slim-line optical media drives. Accordingly, in one embodiment, a stationary docking station 202 may be sized and dimensioned such that it is compatible with a media expansion slot having a height of about 12.7 mm or 9.5 mm and a width of about 128 mm. However, the stationary docking stations disclosed herein are not limited to being compatible with such dimensions, and the stationary docking stations may be dimensioned to be compatible with any suitable or desirable dimensions. The stationary docking station 202 may be installed in a media drive expansion slot by means similar to those used for optical media drives, and in some embodiments may be "plug and play," as understood by those skilled in the art. In this regard, the stationary docking station 202 may include one or more suitable connectors 208 or connecting means, such as but not limited to a serial ATA (SATA) connector, for operably connecting the stationary docking station with the remaining components of the host computing device, such as the processing components, via a bus. While generally intended to be left in a media drive expansion slot for an extended period of time, the stationary docking station 202 may be installed temporarily or permanently in the media drive expansion slot. As described above with the embodiment of FIG. 1, accordingly, the stationary docking station 202 may include an eject latch, permitting relatively easy removal from the media drive expansion slot. The stationary docking station 202 may also include other additional features, such as but not limited to indicator lights, etc.

Figure 3:
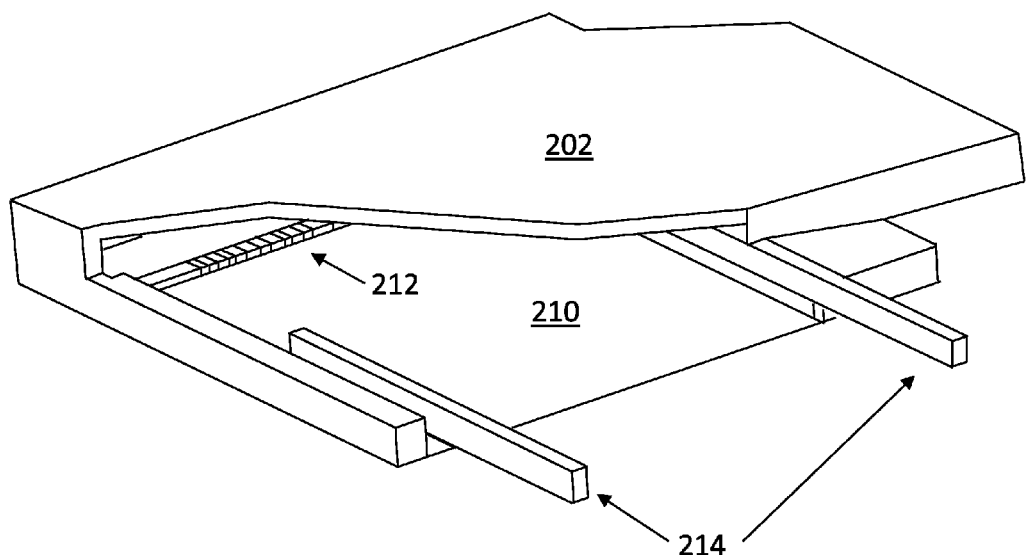
FIG. 3 is a perspective view of a stationary cartridge receptacle of the embodiment of a system and method for removable memory cartridges and docking stations compatible with media drive slots of FIG. 2.

FIGS. 2 and 3 illustrate the stationary docking station 202 with a portion of the top cover omitted for clarity. As illustrated in FIGS. 2 and 3, the stationary docking station 202 may include a receiving bay 210 or slot for receiving a removable memory element 206. The receiving bay 210, accordingly, may be sized and dimensioned such that the removable memory element 206 will substantially easily fit into and be accepted by the receiving bay. The receiving bay 210 may be sized and dimensioned such that the removable memory element 206 may partially, substantially, substantially entirely, or entirely fit within the receiving bay. In one particular embodiment, the receiving bay 210 may have substantially the same size and dimensions as the removable memory element 206, although slightly larger than the removable memory element, thereby permitting the removable memory element to fit substantially or entirely within the receiving bay. As described above with respect to the embodiment of FIG. 1, the receiving bay 210 may include one or more suitable connectors 212 or connecting means, such as but not limited to a SATA connector, for operably connecting the removable memory element 206 with the stationary docking station 202. Similarly, the stationary docking station 202 may include one or more electrical components provided, for example, in a printed circuit board assembly interconnected between the connector 208 and the connector 212, which may be used to, for example but not limited to, translate communications received by the processing components of the server or personal computer to communications that would be understood by the removable memory element 206 or to perform data storage management tasks.

The stationary docking station 202 may include alignment features 214, which may serve to align the removable memory element 206 as it is received by the receiving bay 210. In one embodiment, the alignment features 214 may extend from the stationary docking station 202 to assist in the insertion process of the removable memory element 206. Generally, during operation of the system 200, wherein the removable memory element 206 is positioned within the receiving bay and being accessed through the stationary docking station 202, and in idle states, the alignment features 214 will normally be retracted within the stationary docking station 202, generally within or near the receiving bay 210.

The alignment features 214 may actuate and extend out form the stationary docking station 202 upon commencement of the insertion process for the removable memory element 206. While generally illustrated as having two extension arms that extend and retract for assisting in the insertion process for the removable memory element 206, the alignment features 214 as shown are provided for illustrative purposes, and the actual implementation of alignment features 214 may differ from those shown, and in some embodiments for example, may reside instead on the memory cartridge 204 or removable memory element 206. Similarly, in other embodiments, the alignment features 214 may include fixed structures, such as but not limited to grooves, notches, etc., as opposed to structures that extend and retract, to assist in the insertion process of the removable memory element 206.

FIG. 2 also illustrates the memory cartridge 204 with a portion of the top cover omitted for clarity. As indicated above, the memory cartridge 204 is illustrated as presently housing the removable memory element 206. The memory cartridge 204 may have any suitable outer dimensions, as desired or specified. The memory cartridge 204, like the stationary docking station 202, may include a receiving bay 216 or slot for receiving the removable memory element 206. The receiving bay 216, like receiving bay 210, accordingly, may be sized and dimensioned such that the removable memory element 206 will substantially easily fit and be accepted by the receiving bay. The receiving bay 216 may be sized and dimensioned such that the removable memory element 206 may partially, substantially, substantially entirely, or entirely fit within the receiving bay. In one particular embodiment, the receiving bay 216 may have substantially the same size and dimensions as the removable memory element 206, although slightly larger than the removable memory element, thereby permitting the removable memory element to fit substantially or entirely within the receiving bay.

The memory cartridge 204 may act as a carrying case and/or a protective shell for the removable memory element 206. The memory cartridge 204 may, in some embodiments, include shock and/or vibration protection for the removable memory element 206 contained therein, such as but not limited to shock and/or vibration bumpers 218 or an internal cradle element 218 that can be configured for cradling the removable memory element 206, and which may be composed of a material and design suitable for providing protection for the removable memory element from shock and vibration. In this regard, shock and/or vibration protection may be provided to protect against shock and/or vibration in the x, y, and/or z coordinate directions.

As indicated above, a removable memory element 206 may be removably positioned partially, substantially, substantially entirely, or entirely within the receiving bay 216 of the memory cartridge 204 and may be transferred to a position partially, substantially, substantially entirely, or entirely within the receiving bay 210 of the stationary docking station 202. As such, the removable memory element 206 may be sized and dimensioned such at least a portion of the removable memory element 206 will substantially easily fit and be accepted by either receiving bay 210, 216. In a particular embodiment, as indicated above, the removable memory element 206 may have substantially the same size and dimensions as the receiving bays 210, 216, although slightly smaller than the receiving bays, thereby permitting the removable memory element to fit substantially or entirely within the receiving bays. The removable memory element 206 may include data storage or memory elements or devices, such as hard disk drives or solid state devices, and any other hardware and software desired for controlling the data storage devices or providing data storage management. As mentioned above, a traditional slim-line slot has a maximum height of 12.7 mm or 9.5 mm, or other maximum height; such height can provide sufficient clearance for a removable memory element 206 to contain a suitable number of, for example, 7 mm, 2.5" (or 63.5 mm) hard disk drives. However, as technology increases and sizes decrease, it is appreciated that any suitable number, type, and size of hard disk drives at any suitable size may be used. Similarly, the removable memory element 206 may additionally or alternatively include any suitable amount of solid state memory devices, which again may increase as technology increases and sizes decrease. The removable memory element 206 may include one or more suitable connectors 220 or connecting means, such as but not limited to a SATA connector, for operably connecting the removable memory element 206 with the stationary docking station 202, via the connector 212.

FIG. 2 illustrates the memory cartridge 204 positioned adjacent to the stationary docking station 202, generally in a loading position ready for insertion of the removable memory element 206 into the receiving bay 210 of the stationary docking station. During the insertion operation, in one embodiment, the alignment features 214 may be extended toward and into the memory cartridge 204. In some embodiments, the alignment features may align with, operably couple with, or otherwise attach with latching alignment receptacles 222 in the memory cartridge 204. As indicated above, the alignment features 214 may assist in accurately positioning the removable memory element 206 relative to the receiving bay 210 of the stationary docking station 202.

Figure 4:
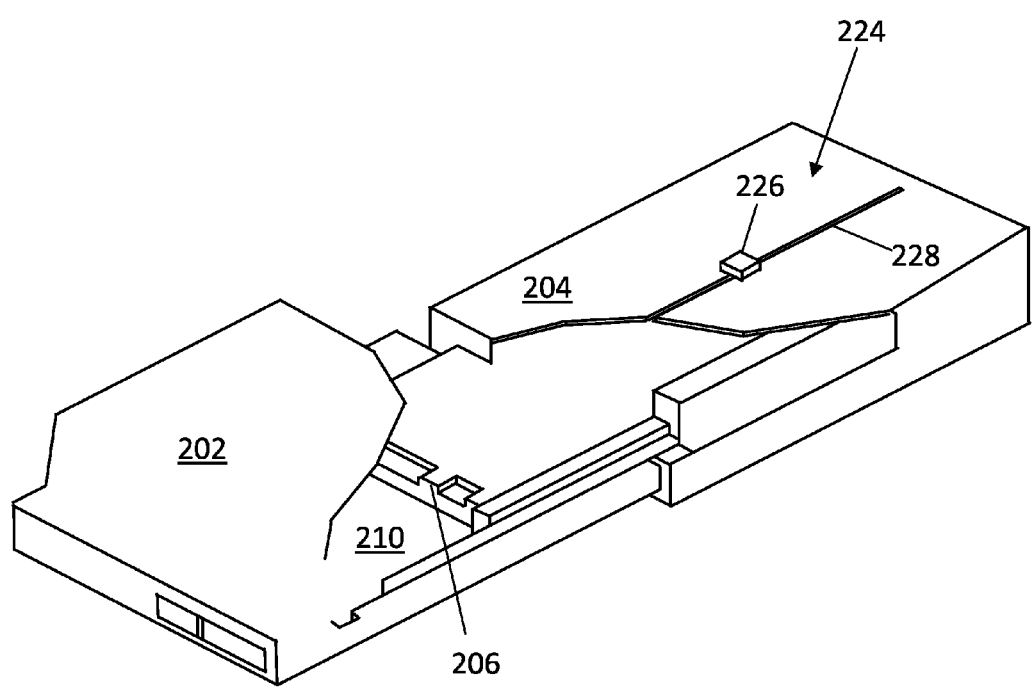
FIG. 4 is a perspective view of the embodiment of a system and method for removable memory cartridges and docking stations compatible with media drive slots of FIG. 2, illustrating the removable memory cartridge being transferred to the stationary cartridge receptacle.

FIG. 4 illustrates the removable memory element 206 partially transferred or loaded into the receiving bay 210 of the stationary docking station 202. In some embodiments, the memory cartridge 204 may include a loading mechanism 224 for causing the removable memory element to be transferred to the receiving bay. While illustrated as a slide mechanism 226, which is configured for sliding along groove 228 in order to eject the removable memory element 206 from the memory cartridge 204, the loading mechanism 224, in other embodiments, could be any suitable means for ejecting the removable memory element from the memory cartridge, such as but not limited to, an internal spring device, actuator, or any other suitable mechanism which causes the transfer of the memory element from the memory cartridge toward and into the stationary docking station 202.

Figure 5:
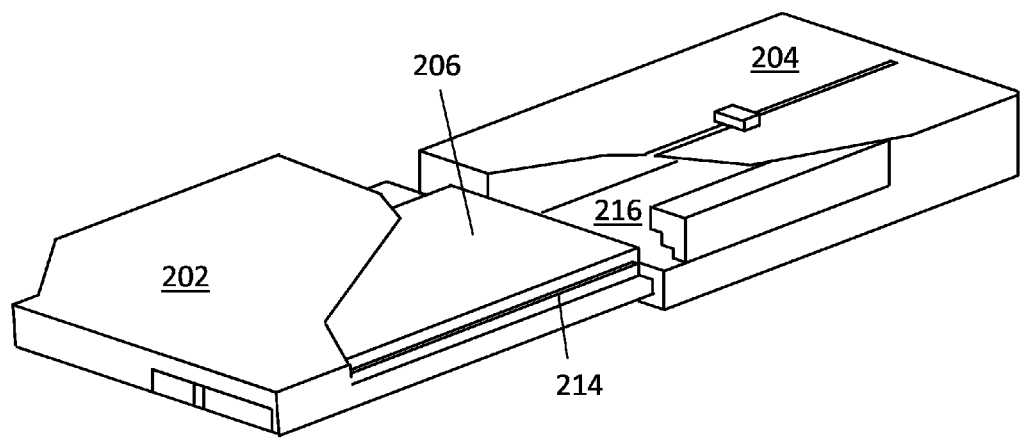
FIG. 5 is a perspective view of the embodiment of a system and method for removable memory cartridges and docking stations compatible with media drive slots of FIG. 2, illustrating the removable memory cartridge transferred to the stationary cartridge receptacle.

FIG. 5 illustrates the removable memory element 206 fully ejected from the memory cartridge 204 and inserted or loaded into the receiving bay 210 of the stationary docking station 202, and in position to operate as a data storage device. In this position, alignment features 214 may also be fully retracted into the stationary docking station 202. Additionally, electrical connectors 212 and 220 may be operably connected or engaged electrically. Accordingly, the memory cartridge 204, with removable memory element 206 removed therefrom, may be removed from the loading position.

To remove the removable memory element 206 from the stationary docking station 202, the memory cartridge 204 may again be positioned adjacent to the receiving bay 210 of the stationary docking station. An eject mechanism of the stationary docking station 202 may be actuated, thereby causing the removable memory element to be ejected from the receiving bay 210 and into the receiving bay 216 of the memory cartridge 204. As with the insertion operation, in one embodiment, the alignment features 214 may be extended toward and into the memory cartridge 204. In further embodiments, the alignment features 214 may align with, operably couple with, or otherwise attach with the latching alignment receptacles 222 in the memory cartridge 204. The alignment features 214 may assist in accurately positioning the removable memory element 206 relative to the receiving bay 216 of the memory cartridge 204, and may guide the ejected removable memory element into the receiving bay of the memory cartridge. Once the removable memory element is positioned at least partially within the memory cartridge 204, the alignment features may be retracted back into the stationary docking station 202.

Figure 6:
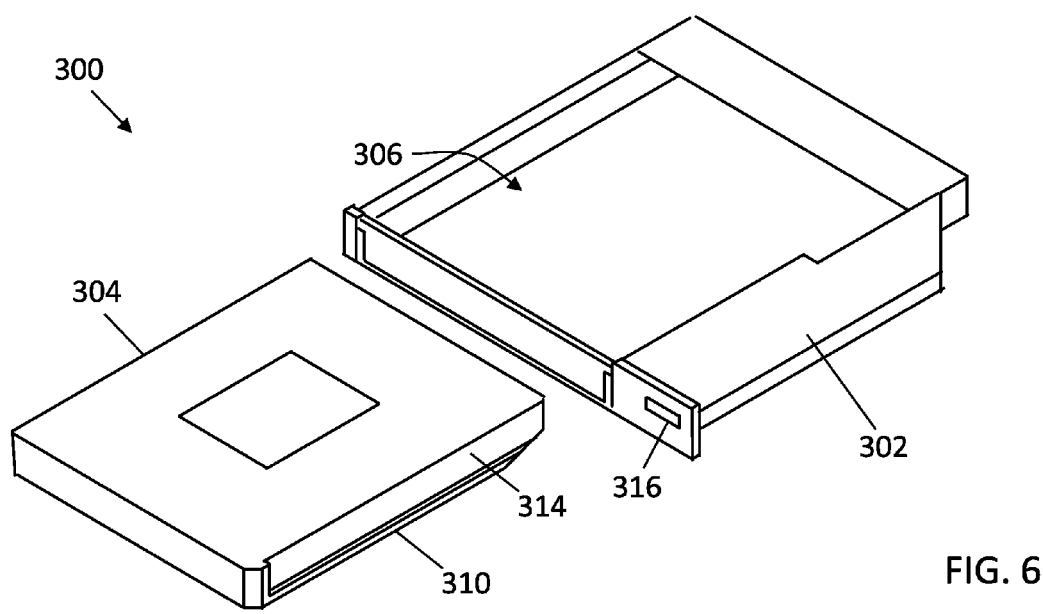
FIG. 6 is a perspective view of another embodiment of a system and method for removable memory cartridges and docking stations compatible with media drive slots according to the present disclosure.
Figure 7:
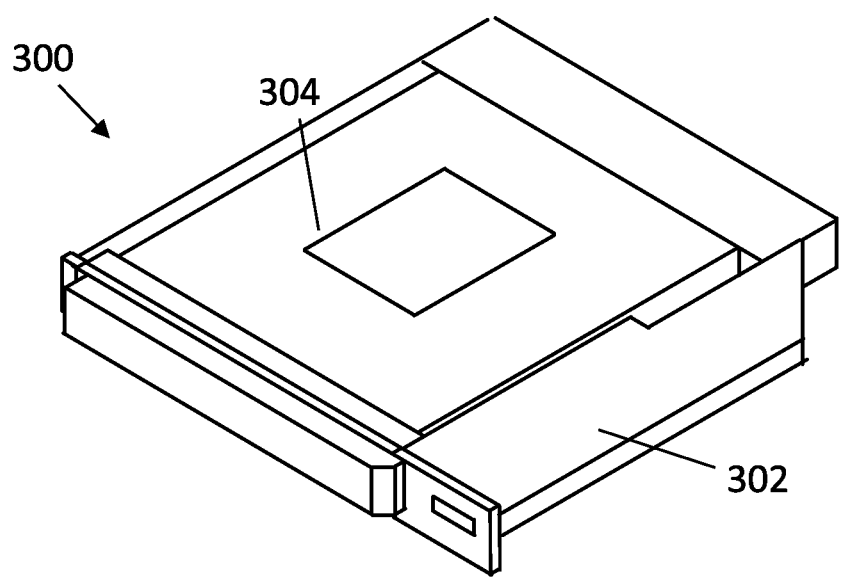
FIG. 7 is a perspective view of the embodiment of a system and method for removable memory cartridges and docking stations compatible with media drive slots of FIG. 6, illustrating the removable memory cartridge positioned within the stationary cartridge receptacle.

In another embodiment, illustrated in FIGS. 6 and 7, a system 300 for a removable memory cartridge and docking station compatible with media drive slots as disclosed herein, may be configured for receiving removable memory cartridges with thicknesses very near or substantially equal to the maximum opening height of media drive slot, such as a slim-line media slot. Particularly, a system 300 for a removable memory cartridge and docking station compatible with media drive slots may include a docking station or stationary memory cartridge receptacle 302 and a removable memory cartridge 304. Together, the stationary cartridge receptacle 302 and removable memory cartridge 304 form a storage element, which is accessible by a host computing device, such as but not limited to a server or personal computer.

The stationary cartridge receptacle 302 may be sized and dimensioned such that it is compatible with standard dimensions of a mounting slot for a media drive, such as slots designed for slim-line optical media drives. As discussed above, a traditional slim-line media expansion slot has maximum cross-section dimensions of 12.7 mm×128 mm, 9.5 mm×128 mm, or other dimensions. Accordingly, in one embodiment, a stationary cartridge receptacle 302 may be sized and dimensioned such that it is compatible with a media expansion slot having a height of about 12.7 mm or 9.5 mm and a width of about 128 mm. However, the stationary cartridge receptacles disclosed herein are not limited to being compatible with such dimensions, and the stationary cartridge receptacles may be dimensioned to be compatible with any suitable or desirable dimensions. Additionally, in some embodiments, the stationary cartridge receptacle 302 may be particularly configured to enable the use of expanded capacity 12.5 mm thick HDDs. In this regard, the 12.7 mm (or other) height of the standard slim-line media expansion slot form factor restricts the maximum thickness of a removable memory cartridge which can inserted into the stationary cartridge receptacle. For example, in the case of 2.5 inch form-factor HDDs, the 12.5 mm height of the drives would nominally not have enough clearance to fit into a stationary cartridge receptacle designed for a slim-line media expansion slot, such as that of the embodiment of FIG. 1. However, as illustrated in FIG. 6, by removing portions of the outer shell of the stationary cartridge receptacle 302, such as in the regions where the removable memory cartridge 304 would reside, additional clearance can be gained to accommodate a 12.5 mm height HDD. In additional or alternative embodiments, the additional clearance or space afforded by elimination of outer shell material of the stationary cartridge receptacle 302 can be used to incorporate shock and/or vibration protection to the removable memory cartridge 304, for example on removable memory cartridges containing other form-form factor memory elements, such as 9.5 mm or 7 mm HDDs.

FIG. 7, for example, illustrates a removable memory cartridge 304 fully inserted into a stationary cartridge receptacle 302. Particularly, FIG. 7 illustrates that by omitting top and bottom portions of the outer shell of the stationary cartridge receptacle 302, the removable memory cartridge 304 can be configured such that it has a height of very near or substantially equal to the height of the stationary cartridge receptacle or otherwise very near or substantially equal to the maximum opening height of media drive slot, such as a slim-line media slot. With this configuration, it is possible, for example, to load a 12.5 mm, three-platter disk drive into a stationary cartridge receptacle compatible with the 12.7 mm or 9.5 mm (or other) slim-line optical media drive slot. Alternatively, for example, the added cartridge height can accommodate removable memory cartridge designs that provide additional shock and/or vibration protection when used with 9.5 mm and 7 mm disk drives. In this regard, shock and/or vibration protection may be provided to protect against shock and/or vibration in the x, y, and/or z coordinate directions.

The stationary cartridge receptacle 302 may be installed in a media drive expansion slot by means similar to those used for optical media drives, and in some embodiments may be "plug and play," as understood by those skilled in the art. In this regard, the stationary cartridge receptacle 302 may include one or more suitable connectors or connecting means, such as but not limited to a serial ATA (SATA) connector, for operably connecting the stationary cartridge receptacle with the remaining components of the host computing device, such as the processing components, via a bus. While generally intended to be left in a media drive expansion slot for an extended period of time, the stationary cartridge receptacle 302 may be installed temporarily or permanently in the media drive expansion slot. In this regard, the stationary cartridge receptacle 302 may include an eject latch, permitting relatively easy removal from the media drive expansion slot. The stationary cartridge receptacle 302 may also include other additional features, such as but not limited to indicator lights, etc.

As illustrated in FIG. 6, the stationary cartridge receptacle 302 may include a receiving bay 306 or slot for receiving a removable memory cartridge 304. The receiving bay 306, accordingly, may be sized and dimensioned such that the removable memory cartridge 304 will substantially easily fit and be accepted by the receiving bay. The receiving bay 306 may be sized and dimensioned such that the removable memory cartridge 304 may partially, substantially, substantially entirely, or entirely fit within the receiving bay. In one particular embodiment, the receiving bay 306 may have substantially the same width as the removable memory cartridge 304, although slightly larger than the width of the removable memory cartridge, thereby permitting the removable memory cartridge to fit substantially or entirely within the receiving bay. In one embodiment, the receiving bay 306 may include slots or other guiding or positioning structures on one or both sides, which may provide guiding and support functions when a memory cartridge 304 is inserted therein. Corresponding slides or other positioning structures 310 on the side of the removable memory cartridge 304 may be provided and may substantially align or fit with the slots. The slots and corresponding structures 310 are illustrative, and it is recognized that cartridge guiding and support functions may be accomplished by a variety of features, such as but not limited to alignment features that protrude from the stationary cartridge receptacle 302 and align with or operably couple with corresponding slots on the removable memory cartridge, as similarly discussed above with respect to the embodiment of FIG. 2.

The receiving bay 306 may include one or more suitable connectors or connecting means, such as but not limited to a SATA connector, for operably connecting the removable memory cartridge 304 with the stationary cartridge receptacle 302. The stationary cartridge receptacle 302 may include one or more electrical components provided, for example, in a printed circuit board assembly interconnected between the connector and the connector of the stationary cartridge receptacle, discussed above. The electrical components, such as the printed circuit board assembly, may be used to, for example but not limited to, translate communications received by the processing components of the server or personal computer to communications that would be understood by the removable memory cartridge 304 or to perform data storage management tasks.

As indicated above, a removable memory cartridge 304 may be removably positioned partially, substantially, substantially entirely, or entirely within the receiving bay 306 of the stationary cartridge receptacle 302. As such, the removable memory cartridge 304 may be sized and dimensioned such at least a portion of the removable memory cartridge will substantially easily fit and be accepted by the receiving bay 306. In a particular embodiment, as indicated above, the removable memory cartridge 304 may have substantially the same width as the receiving bay 306, although slightly smaller in width than the receiving bay, thereby permitting the removable memory cartridge to fit substantially or entirely within the receiving bay. The removable memory cartridge 304 may include data storage or memory elements or devices, such as hard disk drives or solid state devices, and any other hardware and software desired for controlling the data storage devices or providing data storage management. As mentioned above, a traditional slim-line slot has a maximum height of 12.7 mm or 9.5 mm, or other height; such height can provide sufficient clearance for a removable memory cartridge 304 to contain a suitable number of, for example, 7 mm, 2.5" (63.5 mm) hard disk drives. However, as technology increases and sizes decrease, it is appreciated that any suitable number, type, and size of hard disk drives at any suitable size may be used. Similarly, the removable memory cartridge 304 may additionally or alternatively include any suitable amount of solid state memory devices, which again may increase as technology increases and sizes decrease. The removable memory cartridge 304 may include one or more suitable connectors or connecting means, such as but not limited to a SATA connector, for operably connecting the removable memory cartridge 304 with the stationary cartridge receptacle 302, via the connector of the receiving bay.

In some embodiments, the removable memory cartridge 304 may include shock and/or vibration protection for the memory elements contained therein. In one embodiment, shock and/or vibration protection may be incorporated in a ring or circumference 314 of shock and/or vibration protection material or coating partially or fully circumferentially surrounding the removable memory cartridge 304. However, other variants of shock and/or vibration protection are contemplated by, and within the scope of the present disclosure. As indicated above, this may permit shock and/or vibration protection against shock and/or vibration in the x, y, and/or z coordinate directions.

In some embodiments, one or both of the stationary cartridge receptacle 302 or removable memory cartridge 304 may include release devices, such as but not limited to, mechanical release mechanisms, that permit the removable memory cartridge to be relatively easily removed or ejected from the stationary cartridge receptacle. In additional embodiments, the release devices may include an actuator or control mechanism 316, such as but not limited to, a button or other tactile means, for actuating the release device such that the removable memory cartridge 304 may be released or partially or substantially ejected from the stationary cartridge receptacle, and removed therefrom.

In some embodiments, a cost effective means for securing removable memory cartridges from counterfeit products may be desirable. In such embodiments, it would also be desirable that such means for securing removable memory cartridges does not alter the stored information or data format of the stored information in any manner. Additionally, such securing means can be designed to permit secure personalization so that third-parties can build data storage devices containing an OEM (original equipment manufacturer) secret without concern for the theft of that secret.

In one embodiment, the prevention of counterfeit removable memory cartridges can be accomplished by using a crypto-authentication system. For example, in one embodiment, the prevention of counterfeit removable memory cartridges can be accomplished by embedding, into the removable memory cartridges, authentication chips designed to securely authenticate them. Each chip, for example, may contain a preprogrammed serial number or other unique number, which is guaranteed to be unique or may otherwise be configured to particularly identify a removable memory cartridge or that a removable memory cartridge is not counterfeit. In one embodiment, the authentication chips may be the type of crypto-authentication devices manufactured by Atmel Corporation of San Jose, Calif., including the AT88SA102 family of chips.

Figure 8A:
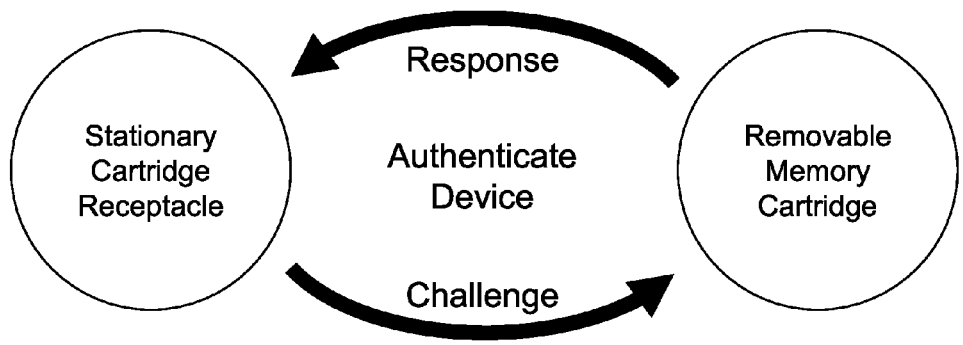
FIG. 8A is a chart illustrating one method for authentication of removable memory cartridges.

As illustrated in FIG. 8A, in a particular embodiment, the crypto-authentication system may use a standard response protocol from the host computing device to generate a keyed response from the removable memory cartridge. In this regard, when a removable memory cartridge is inserted into the receiving bay of the stationary cartridge receptacle, the stationary cartridge receptacle can be configured to challenge or inquire the removable memory cartridge with an authentication phrase. Only authentic removable memory cartridges should be able to respond with an acceptable response to the authentication phrase. In further embodiments, specific cartridge information, such as but not limited to, serial numbers, can be incorporated into the response calculation. Since the authentication process may be independent of data channel operations, standardized encryption hardware can be used substantially without modification.

The authentication is cryptographically strong, and provides a cost effective solution to assure device authentication. The authentication is substantially transparent in operation, without interfering with operation of the hard drive or other removable data storage device.

This contrasts with other, less cost effective techniques, which may interfere with device operation, for example self-encrypting drives and other device implementations that can interfere with serial (or parallel) advanced technology attachment (SATA or ATA) and serial (or parallel) small computer system interface (SAS or SCSI) devices. Depending on application, the authentication system is also configurable to prevent access to unauthorized parties or unauthorized storage devices (cartridges), and to reduce security risks and malware exposure potential by preventing unauthorized replacement of hard drives and other removable storage media.

Figure 8B:
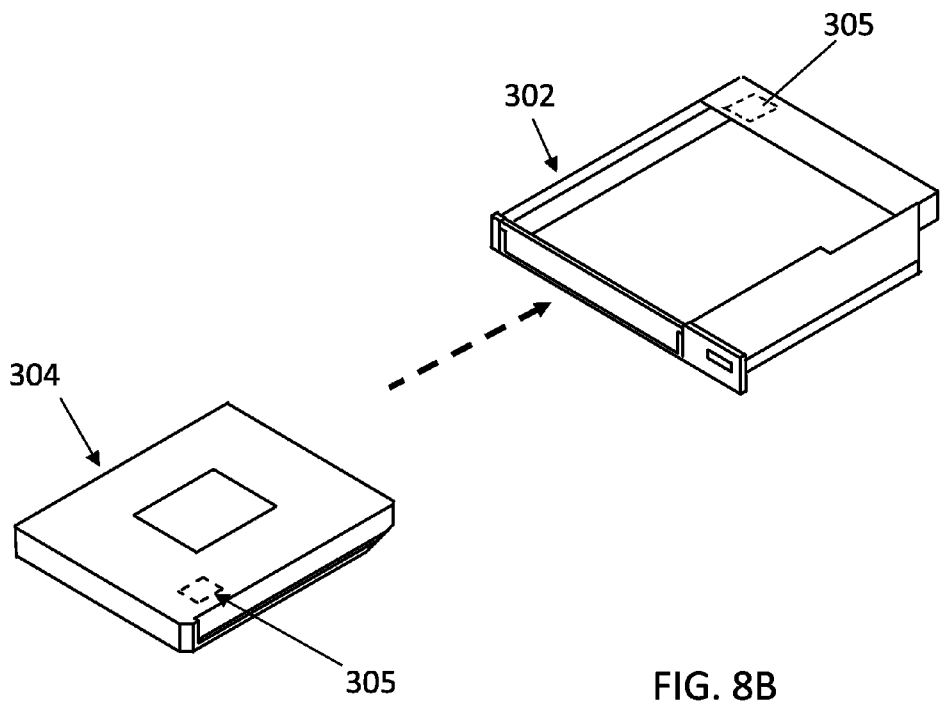
FIG. 8B is a schematic diagram showing an exemplary implementation of the authentication method.

In one implementation, for example as shown in FIG. 8B, one or both of dock station (or media slot adapter) 302 and removable data cartridge 304 include an authentication device 305 configured for storing and protecting private keys, for example a relatively cost effective crypto authentication chip such as an ATMEL ATSHA204, as available from Atmel Corporation. Alternatively, another security device, circuit component or chip 305 may be provided, utilizing either public or private keys, or a combination thereof, capable of storing and protecting private keys.

Authentication device 305 may also be operable to calculate or determine secure hash algorithm (SHA) values, including, but not limited to, SHA-256 and other SHA family cryptographic hash function values. In these implementations, system security may utilize the ability of authentication device 305 to store a key, for example a unique, securely stored private key.

In one method of operation, a root key, such as a 256 bit random key created from a strong source of entropy, is stored in authentication device 305 of docking station 302, for example in a protected area of memory in authentication device 305. The root key can be concatenated with a unique HDD serial number or other medium identifier to generate a secure key, which is stored in authentication device 305 of data cartridge 304, for example in a read-only area of memory in authentication device 305. The root key and the secure key are utilized to authenticate data cartridge 304, as described below.

Figure 9:
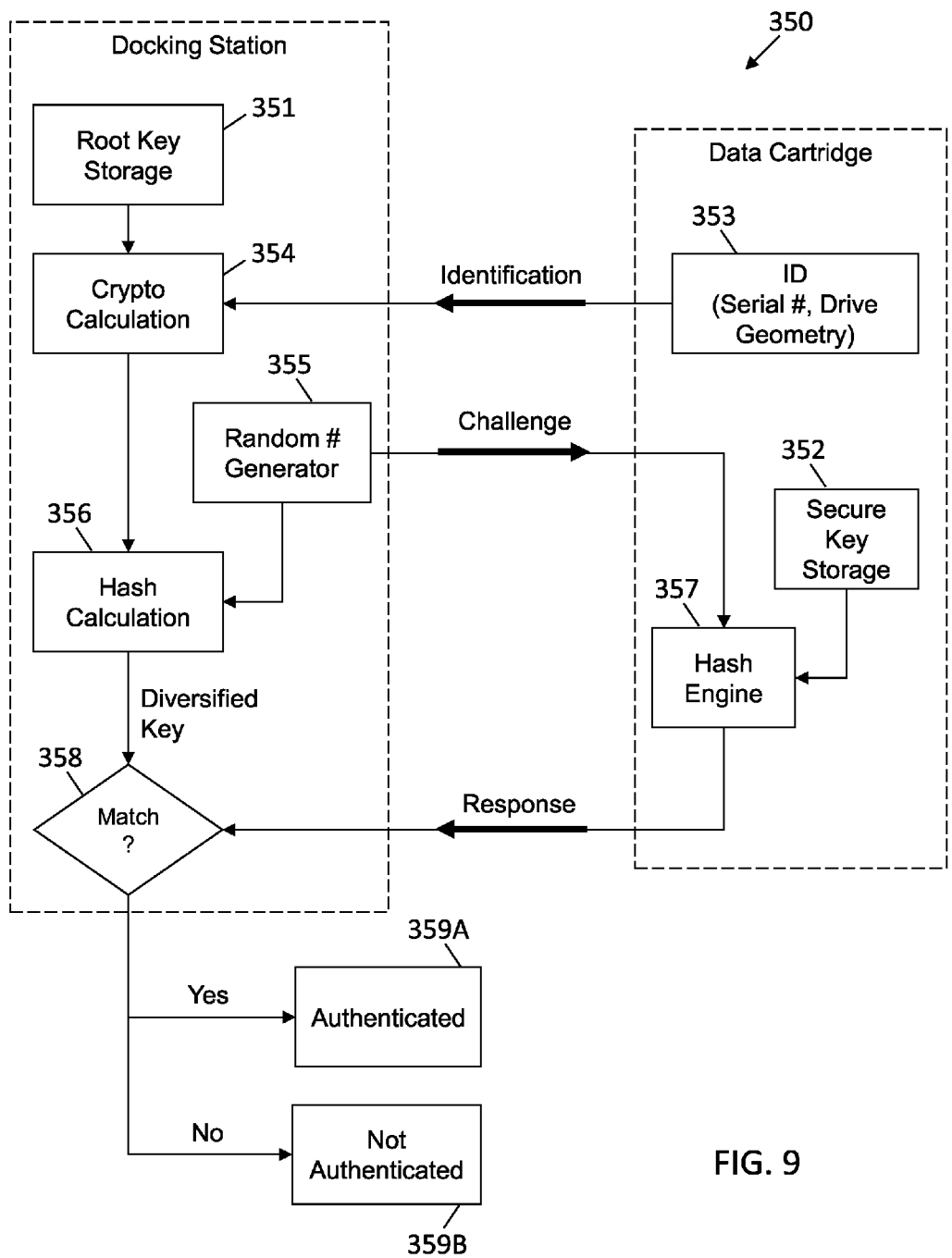
FIG. 9 is a block diagram illustrating an authentication method for the removable memory cartridge and docking station systems of the present discosure.

FIG. 9 is a block diagram illustrating authentication method 350, for example to authenticate a removable data cartridge 304 for use with a docking station or media adapter device 302, or with the other data cartridge and adapter/docking station devices described herein. Method 350 include one or more steps including, but not limited to, root key storage (step 351), secure key storage (step 352), identification (step 353), cryptographic calculation (step 354), challenge (step 355), hash calculation (step 356), response (step 357), match checking (step 358), and authentication (step 359A) or failure to authenticate (step 359B).

In operation of method 350 a root key is stored in the docking station authentication device (step 351), for example in a secure storage area, and a secure key is stored in the data cartridge authentication device (step 352), for example in a read only storage area. The authentication device on the data cartridge identifies the data cartridge to the authentication device on the docking station (step 353), for example by sending a unique serial number, drive characteristics, or a combination of such identification data.

The authentication device on the docking station concatenates the ID data with the root key (step 354), for example using a secure hashing algorithm such as SHA-256, or other cryptographic calculation, and transmits a random number, nonce, or other challenge information to the authentication device on the data cartridge (step 355). The authentication device on the data cartridge responds by concatenating the cartridge ID (or other results of identification, step 353) with the nonce (step 355) using a secure hash engine algorithm such as SHA-256, or other cryptographic calculation, and sends the results as a response to the authentication device on the docking station (step 357).

The authentication device on the docking station compares the nonce (or other challenge information) with the response from the authentication device on the data cartridge (step 358). If the results match, the data cartridge is authenticated (step 359A), and data communications with the host device are enabled (that is, authentication is successful). If the results do not match, the data cartridge is not authenticated (step 359B), and data communications with the host device are not enabled (that is, authentication fails).

Figure 10:
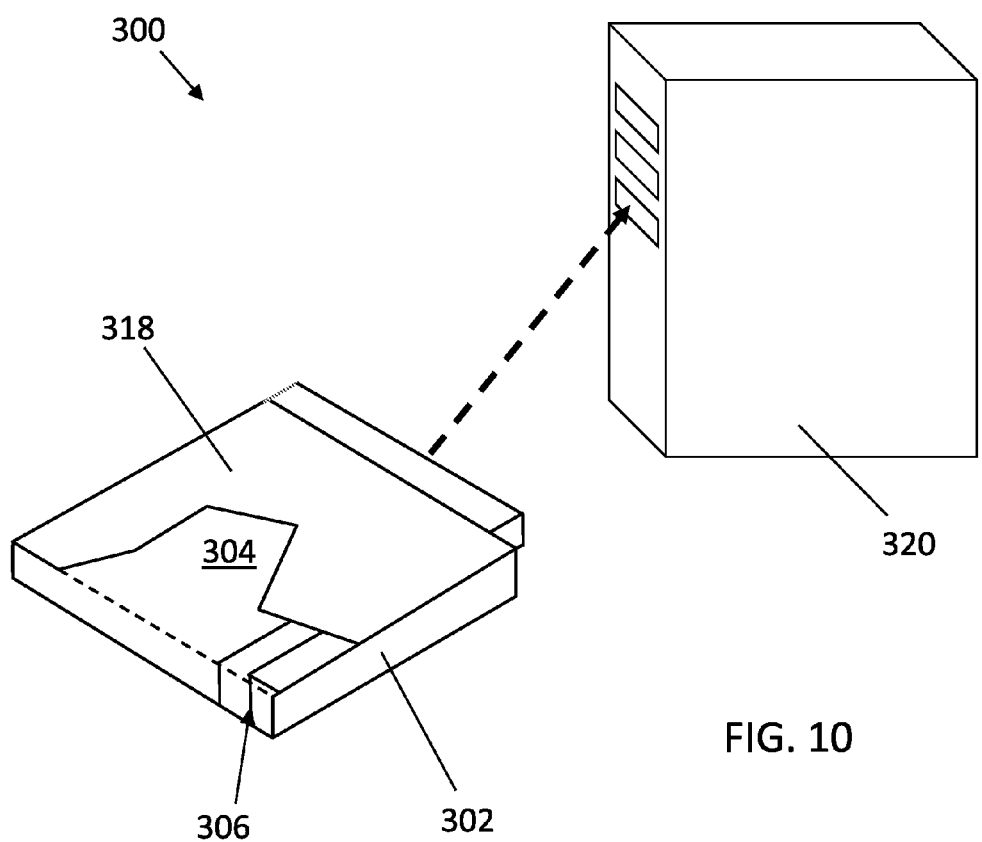
FIG. 10 is a diagram of a system and method for removable memory cartridges and docking stations or media drive adapters coupled to a media drive slot in a host system, as described herein.

FIG. 10 is a block diagram of a system 300 for removable memory cartridges 304 and docking stations 302, as described above. In this embodiment, the docking station 302 may be provided as a media drive adapter for the removable data cartridge 304, and configured for coupling the data cartridge 304 in data communication within the media drive slot 318 of host system 320.

Host system 320 may comprise a host computer, data processor, data storage system, or other computing or data processing apparatus configured for data communications with the media drive slot 318. The media drive slot 318 may be configured for a DVD, ODD, HDD, or other data storage medium or device, as described above, and the data cartridge 304 may be configured as a HDD, tape drive, optical disk, tape cartridge, flash drive, or other data storage medium.

In one particular embodiment, for the example, the media drive slot 318 may be provided as a DVD, ODD or other optical media drive slot (or expansion slot) configured for use with an optical data storage medium, and the removable data cartridge 304 may be configured as a hard disk drive, tape cartridge, or other magnetic data storage medium. Thus, docking station or sled 302 may function as a media drive adapter for use within media drive slot 318, as configured for a one type of data storage media. The media drive adapter is further configured to accept removable data cartridge 304, as configured for another, different type of data storage medium, and to place removable data cartridge 304 in data communication with host system 320 via media drive slot 318.

As shown in FIG. 10, the media drive adapter 302 includes a drive bay 306 configured to accommodate the removable data cartridge 304, for example a removable hard drive. The media drive adapter 302 also includes a connector (e.g., connector 114 of FIG. 1) configured for data communication with the removable data cartridge 304, when the removable data cartridge 304 is positioned within the drive bay 306 of the media drive adapter 302.

The media drive adapter 302 also includes a media drive connector (e.g., connector 106 of FIG. 1) configured for data communication with the host system 320, when the media drive adapter 302 is positioned within the media drive slot 318 and the media drive slot 318 is coupled to the host system 320. Thus, the media drive adapter 302 is operable to provide data communication between the host system 320 and the removable data cartridge 304 when the data cartridge 304 is positioned within the drive bay 306 of the media drive adapter 302, inside media drive slot 318 coupled to host system 320.

Figure 11:
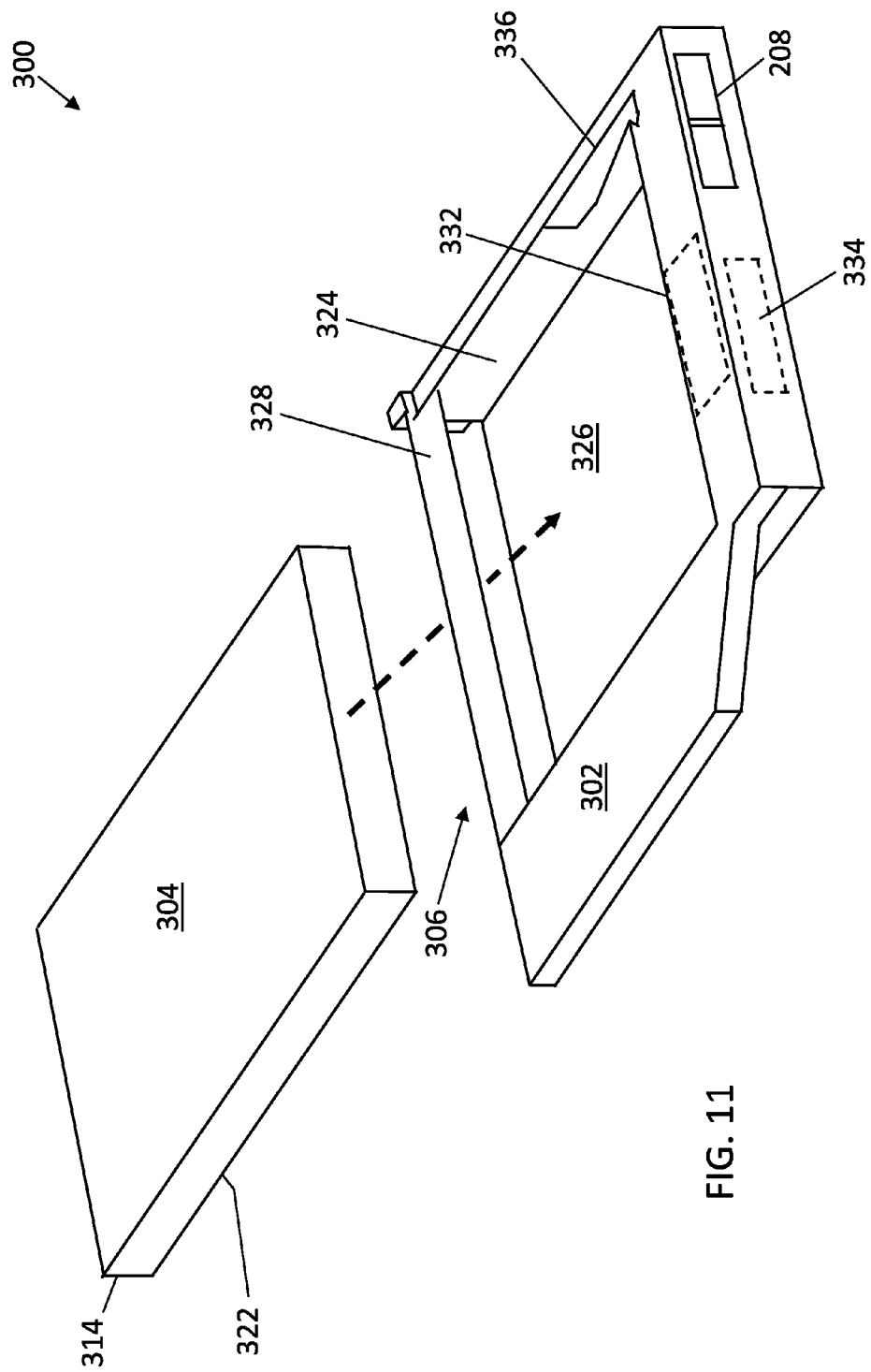
FIG. 11 is a perspective view of an alternate embodiment of a system and method for removable memory cartridges and media drive adapters compatible with different media drive slots, illustrating the removable memory cartridge in a hard disk drive configuration and the media drive adapter configured for compatibility with an optical disk drive slot.

FIG. 11 is a perspective view of an alternate embodiment of a system 300 for removable memory cartridges and docking stations compatible with media drive slots as disclosed herein, configured for a removable memory cartridge in a removable hard disk drive configuration compatible with an optical disk drive media slot, for example on a host computer or host data storage system. As illustrated in FIG. 11, a docking station or stationary memory cartridge receptacle 302 is configured for a removable memory cartridge 304 in the form of a hard disk drive, and compatible with an optical disk drive bay or expansion slot, as described above.

Depending on embodiment, the outer sides or housing 322 of the removable memory cartridge 304 may be variously configured to align or fit with the sides 324 of receiving bay 306 for receiving the cartridge 304 in the receptacle 302, for example with the cartridge 304 retained between the bottom 326 of the receiving bay 306 and a top or cross-member 328, as shown in FIG. 11. Alternatively, the cartridge 304 may be retained within the receiving bay 306 of receptacle 302 utilizing a tabbed configuration or slot and slide arrangement, as described above, with or without one or both of top and bottom side elements 326 and 328. In either embodiment, shock and/or vibration protection may be incorporated in a ring or circumferential component 314 formed of shock and/or vibration protection material, and partially or fully circumferentially surrounding the removable memory cartridge 304.

The stationary memory cartridge receptacle mechanism 302 of FIG. 11 is developed as a docking station or media drive (expansion slot) adapter for a removable hard disk drive (HDD) or other type of data cartridge 304, where receptacle or sled component 302 is configured to fit in an optical drive bay with a particular form factor, for example a 12.7 mm or 9.5 mm (or other) optical drive bay or media expansion slot. The stationary memory cartridge receptacle mechanism 302 allows positive locking of the cartridge 304 into the dock or slot and also provides a soft ejection mechanism in a relatively small or very small and compact design. This design allows for interlock of the HDD cartridge 304 during the host system's assertion of prevent eject status, as directed to the selected or desired optical disk drive (ODD) bay or media expansion slot into which the receptacle 302 is inserted.

The receptacle or docking station 302 provides a media drive connector 208 for communicatively coupling or connecting the receptacle 302 into a drive bay or media expansion slot on the host data storage system or host computer. A micro motor or motor assembly 332 (dashed lines) and a (e.g., small) gear reduction system 334 are coupled to a cam push lock or latch 336. The cam push lock 366 is able to eject the cartridge 304 to a precise location, for removal from receptacle 302 while receptacle 302 is positioned in the ODD bay or media expansion slot.

The motor assembly 332, reduction gearing 334, and cam push lock or latch 336 are operable based upon an eject command from the host system, for example as provided via connector 208. Alternatively, receptacle 302 may be configured for ejection and removal of cartridge 304 based on a direct user command, with or without an override based on the host system's prevent (or allow) eject status, as communicated over connector 208 or other command or data path. The direct user command may be provided by an external control feature 121, as described above, or based on a biasing switch device or other mechanism sensitive to a force or push on cartridge 304, and configured to trigger the ejection mechanism based on such an input.

Figure 12A:
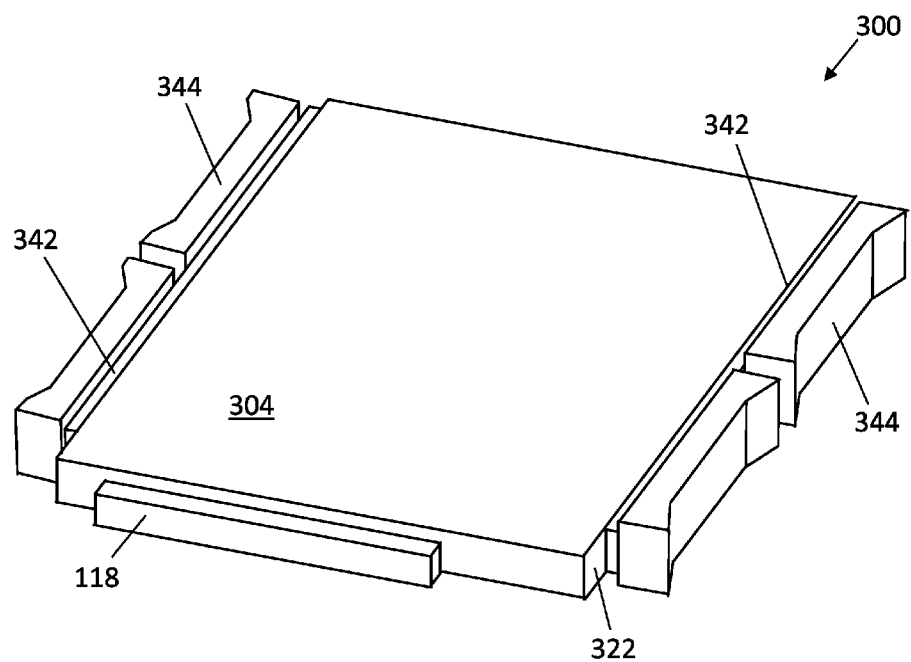
FIG. 12A is a perspective view of an alternate embodiment of a system and method for removable memory cartridges media drive adapters compatible with different media drive slots, illustrating the removable memory cartridge in a hard disk drive configuration with shock absorbing suspension features.
Figure 12B:
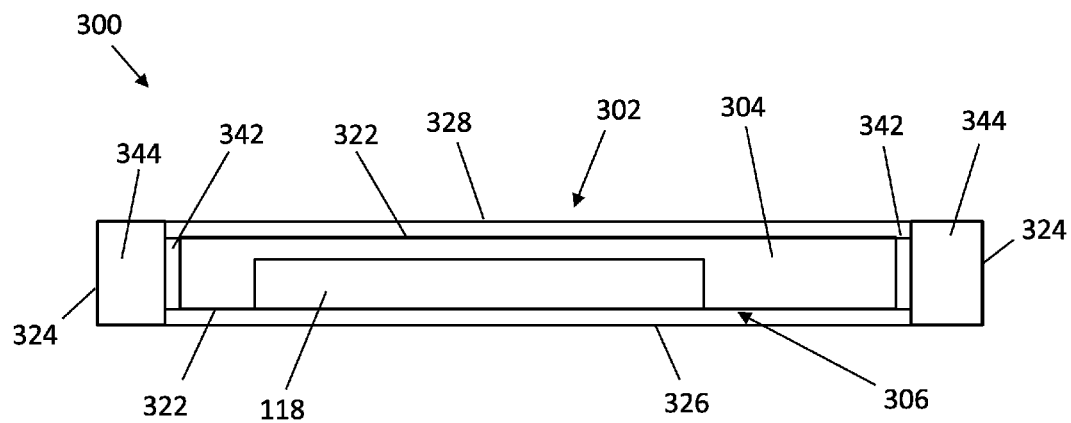
FIG. 12B is a side view of the removable memory cartridge of FIG. 12A, illustrating the mechanical isolation provided by the shock absorbing suspension when inserted into a docking station or media drive adapter.

FIG. 12A is a perspective view of an alternate embodiment of the system 300 for removable memory cartridges and docking stations or receptacles 302 compatible with media drive slots, illustrating a shock absorbing and mechanical isolation suspension system for the removable memory cartridge 304, for example in a HDD removable cartridge format. FIG. 12B is a connector-side view of the data cartridge 304, with the docking connection assembly removed to show the data cartridge 304 with suspension members 342 and shock absorbing bumpers or mechanical isolation members 344 positioned within the drive bay 306 of the docking station 302.

As shown in FIGS. 12A and 12B, the suspension members 342 are coupled to the sides or external housing 322 of the removable data cartridge 304, and the mechanical isolation members 344 are coupled to the suspension members 342. When the data cartridge 304 is positioned inside the drive bay 306 of the receptacle or docking station 302, the mechanical isolation members 344 contact the sides 324 of the receptacle or docking station 302, suspending the data cartridge 304 inside the drive bay 306 (and/or bottom side 326 and top side or cross member 328), at least partially isolating the data cartridge 304 from shock, vibration and other mechanical coupling effects.

The mechanical isolation or damping members 344 may be positioned between the outer case 322 of data cartridge 304 and the inner sides 324 (and/or 326 and 328) of the drive bay 306, inside the docking station or media drive adapter 302. The shock absorbing, damping, anti-vibration and mechanical isolation characteristics of damping members 344 may be selected by utilizing a resilient material in construction, such as a rubber, plastic, polymer or composite material with suitable durability and mechanical damping properties. Thus, the mechanical isolation members 344 may form a resilient mechanical coupling between the data cartridge 304 and the media drive adapter 302 to suspend the data cartridge 304 within the drive bay 306.

As shown in FIG. 12B, the data cartridge case or housing 322 is spaced from the inner sides 324 (and/or 326 and 328) of the drive bay 306, providing energy absorption features to at least partially isolate the data cartridge 304 from mechanical shock and vibration of the media drive adapter 302. Mechanical isolation or members 344 also damp shock and vibration energy, reducing mechanical coupling effects between the data cartridge 304 and the inner sides 324 (and/or 326 and 328) of the drive bay 306, when the data cartridge 304 is inserted into the media drive adapter 302.

The suspension members 342 and mechanical isolation (or resilient damping) members 344 also allow the system 300 full use of the sway space inside the drive bay 306 of media drive adapter 302, substantially in or along the (e.g., flat) plane of the hard drive or other data cartridge 304. This distinguishes from the use of shock absorbing material or systems inside the cover 322 of the data cartridge 304, where placing material between the internal drive and the enclosure or cover 322 may reduce the overall available travel, as compared to the externally damped design of FIG. 12B.

By attaching suspension members 342 and/or motion isolation or bumper members 344 in the form of protrusions from the sides of outer housing 322 of the data cartridge 304, as shown in FIGS. 12A and 12B, the resilient damping material of the motion isolation members 344 is provided on the outside of the HDD or other data cartridge 304. Thus, the full travel distance within the drive bay 306 of the media drive adapter 302 can be utilized for shock absorption and reducing vibrations. This provides the system 300 with a greater range of damping frequencies, and a greater range of damping amplitudes, as compared to damping system provided within the data cartridge housing 322.

The systems and methods for removable memory cartridges and docking stations compatible with different media drive slots, including a stationary cartridge receptacle and a removable memory cartridge, as disclosed herein enable a variety of benefits and advantages. As can be recognized from the foregoing, such benefits and advantages include, but are not limited to, persistent enumerations of a fixed drive letter or target, safe eject mechanisms and services that can prevent data loss, authentication of removable memory cartridge provenance, application of encrypted data storage elements such as those in accordance with the OPAL Storage Specifications, additional shock and drop protection for, for example, sensitive memory elements like HDDs, and spanning of multiple removable memory cartridges permitting expanded capacity.

For example, in traditional systems addressing the media slots wherein an optical drive slot is occupied by a HDD or solid-state memory module, which can be inserted, electrically coupled, mechanically retained, and ejected like an optical drive, each time the unit is inserted into the optical drive slot, a drive letter is assigned. As the same drive or numerous different drives are coupled and ejected from the drive slot, the drive letters are reassigned. Accordingly, there is no drive letter or device persistence. In contrast, because the systems disclosed herein include a stationary cartridge receptacle or stationary docking station that may be kept coupled with the drive slot, the systems disclosed herein permit drive letter or device persistence between the same or different removable memory cartridges/elements.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A data storage system comprising:
a memory cartridge configured for housing a removable memory element comprising a data storage device; and
a docking station in communication with a host device and comprising:
a receiving bay configured for receiving the removable memory element from the memory cartridge, wherein the removable memory element is transferred to a position within the receiving bay so as to put the host system in communication with the data storage device of the removable memory element; and
alignment features configured to operably couple with the memory cartridge and for positioning the removable memory element relative thereto, wherein the memory cartridge is configured for receiving the removable memory element from the docking station.

2. The system of claim 1, wherein the memory cartridge comprises an internal cradle configured for cradling the removable memory element therein and to provide shock and vibration protection in x, y and z coordinate directions.

3. The system of claim 1, wherein the docking station is dimensioned to fit a slim-line media drive slot having a maximum height of 9.5 mm and providing sufficient clearance for the memory cartridge to contain a disk drive and a serial ATA (SATA) connector.

4. The system of claim 3, wherein the removable memory element has a height substantially equal to a height of the docking station.

5. The system of claim 1, wherein the data storage device comprises a removable disk drive storage device.

6. The system of claim 1, wherein the data storage device comprises a solid state data storage device.

7. The system of claim 1, wherein the data storage device comprises a hybrid hard disk and solid state disk data storage device.

8. The system of claim 1, wherein the removable memory element comprises shock protection features to protect against shock and vibration in x, y, and z coordinate directions.

9. The system of claim 1, further comprising authentication devices in each of the removable memory element and the docking station, wherein the authentication devices are configured to authenticate the removable memory element for data communications with the host device, based on a secure algorithm comprising:
storing a root key in the authentication device of the docking station;
storing a secure key in the authentication device of the removable memory element;

identifying the removable memory element to the authentication device of the docking state by sending identification data of the removable memory element;
concatenating the identification data with the root key;
transmitting a nonce to the removable data cartridge, wherein the removable data cartridge responds by concatenating the identification data with the nonce and sending a response to the authentication device;
comparing the nonce with the response; and
authenticating the removable data cartridge and enabling communications with the host device, if results of comparing the nonce with the response match.

10. A media drive comprising:
a drive bay configured to accommodate a removable data cartridge, the removable data cartridge configured as a removable disk drive data storage medium;
a data cartridge connector configured for data communication with the removable data cartridge when the removable data cartridge is positioned within the drive bay; and
a media drive connector configured for data communication with a host system when the media drive is positioned within a media drive slot coupled to the host system, the media drive slot configured for a different storage medium than the removable data cartridge;
wherein the media drive is operable to provide data communication between the host system and the removable data cartridge when the media drive is positioned within the media drive slot and the removable data cartridge is positioned within the drive bay; and
wherein the media drive comprises an authentication device, the authentication device comprising:
a root key storage for storing a root key;
a random number generator for challenging the removable data cartridge; and
a calculator for performing a hash calculation based on an identification of the data cartridge;
wherein the authentication device is operable to authenticate the data cartridge based on a comparison between results of the hash calculation and a response from the data cartridge, by
storing the root key in the authentication device;
storing a secure key in the removable data cartridge;
identifying the data cartridge to the authentication device by sending identification data;
concatenating the identification data with the root key;
transmitting a nonce to the removable data cartridge, wherein the removable data cartridge responds by concatenating the identification data with the nonce and sending a response to the authentication device;
comparing the nonce with the response match; and
authenticating the removable data cartridge and enabling communications with the host device, if results of comparing the nonce with the response match.

11. The media drive of claim 10, wherein the media drive slot is configured for an optical data storage medium.

12. The media drive of claim 11, wherein the removable data cartridge comprises a hard disk drive or HDD data storage medium.

13. The media drive of claim 11, wherein the removable data cartridge comprises a solid state drive or SSD data storage medium.

14. The media drive of claim 11, wherein the removable data cartridge comprises a hybrid data storage medium.

15. The media drive of claim 14, wherein the hybrid data storage medium comprises a magnetic data storage medium and a solid state data storage medium.

16. The media drive of claim 11, wherein the media drive slot comprises an optical disk drive expansion slot.

17. The media drive of claim 10, further comprising an ejection mechanism configured for ejecting the removable data cartridge from the drive bay.

18. The media drive of claim 17, wherein the ejection mechanism comprises a motor and gear assembly coupled to a mechanism configured for ejecting the removable data cartridge from the drive bay based on an ejection command from the host computer or a user.

19. The media drive of claim 18, wherein the mechanism is further configured for locking the removable data cartridge into the drive bay when the removable data cartridge is inserted into the media drive adapter.

20. A data storage system comprising the media drive of claim 10, wherein the removable data cartridge is inserted into the drive bay.

21. The data storage system of claim 20, further comprising a damping mechanism coupled between an outer housing of the removable data cartridge and an inner side of the drive bay, the damping mechanism comprising at least one resilient member configured to suspend the removable data cartridge within the drive bay and to provide at least partial mechanical isolation between the drive bay and the removable data cartridge.

22. A data storage device comprising:
a media drive positioned within a drive slot, the media drive comprising a drive bay and a media drive connector coupled to the drive slot, the media drive connector operable for data communication with a host system coupled to the drive slot;
a removable data cartridge positioned within the drive bay, the removable data cartridge comprising a removable disk drive data storage medium and a serial ATA (SATA) data cartridge connector coupled to the media drive; and
an authentication device configured to authenticate the removable data cartridge for data communications with the host system, based on a secure algorithm comprising:
storing a root key in the authentication device;
storing a secure key in the removable data cartridge;
identifying the data cartridge to the authentication device by sending identification data;
concatenating the identification data with the root key;
transmitting a nonce to the removable data cartridge, wherein the removable data cartridge responds by concatenating the identification data with the nonce and sending a response to the authentication device;
comparing the nonce with the response match; and
authenticating the removable data cartridge and enabling communications with the host device, if results of comparing the nonce with the response match;
wherein the media drive is operable to provide data communications between the host system and the removable data cartridge via the media drive connector and the data cartridge connector.

23. The data storage device of claim 22, further comprising a spring mechanism operable to lock the removable data cartridge into the drive bay when the removable data cartridge is inserted into the media drive adapter.

24. The data storage device of claim 22, wherein the media drive adapter further comprises an ejection mechanism configured to operate a cam to eject the removable data cartridge from the drive bay.

25. The data storage device of claim 22, further comprising a motion isolation mechanism comprising a resilient damping member operable to suspend the removable data cartridge within the drive bay.

26. The data storage device of claim 22, wherein the data storage medium comprises one or more of a magnetic data storage medium and a solid state data storage medium.

27. The data storage device of claim 22, further comprising an authentication device in the media drive adaptor, the authentication device configured to authenticate the data cartridge using a hash calculation based on an identification of the data cartridge.

28. The data storage device of claim 27, wherein the authentication device is further configured to prevent the data communication with the host system when a result of the hash calculation does not match a response from the data cartridge.

* * * * *